Aug. 16, 1966 E. I. FELIXON 3,266,327
PNEUMATIC BALL-TYPE VIBROMOTOR
Filed April 24, 1964

United States Patent Office 3,266,327
Patented August 16, 1966

3,266,327
PNEUMATIC BALL-TYPE VIBROMOTOR
Efim Isaakovich Felixon, Moscow, U.S.S.R., assignor to Nauchno-Issledovatelsky i Konstruktorsky Institute ispytalelnykh mashin Pribour i sredstr izmerenia mass, Moscow, U.S.S.R.
Filed Apr. 24, 1964, Ser. No. 364,060
5 Claims. (Cl. 74—87)

The present invention relates to a pneumatic motor and more particularly to a pneumatic ball type vibromotor.

Existing vibromotors are manufactured with a ring having an inner race with bored inlet ports therein for admission of compressed air. Since the inlet ports must be a strictly definite size and shape and the rings are to retain continuity of the race the manufacturing of such rings presents a difficult problem.

Another shortcoming of the existing vibromotors is the low wear-resisting qualities. All previous attempts to solve the problems gave no satisfactory results.

We have succeeded in overcoming all the difficulties involved and in carrying the invention into effect.

An object of the present invention is to provide a pneumatic ball type vibromotor simple in maintenance and of long service life.

Another object of the invention is to make it possible for the vibromotor to use standard ball-bearing rings.

A further object of the invention is to provide the use of the above said rings without inlet holes therein, thanks to which the vibromotor repairs would consist of ring and ball replacement.

It is also an object of the invention to simplify the problem of assembling and disassembling the vibromotor.

Figure 1:
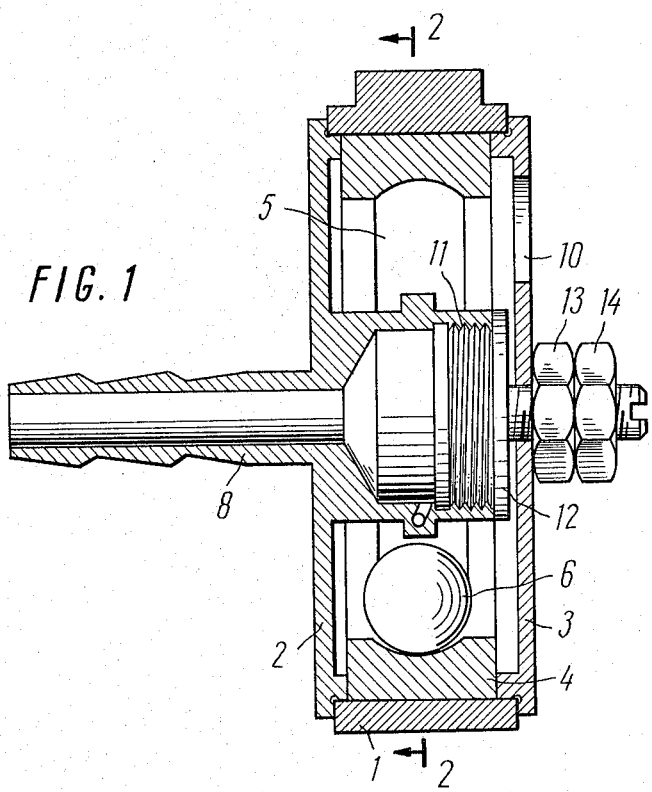
Figure 2:
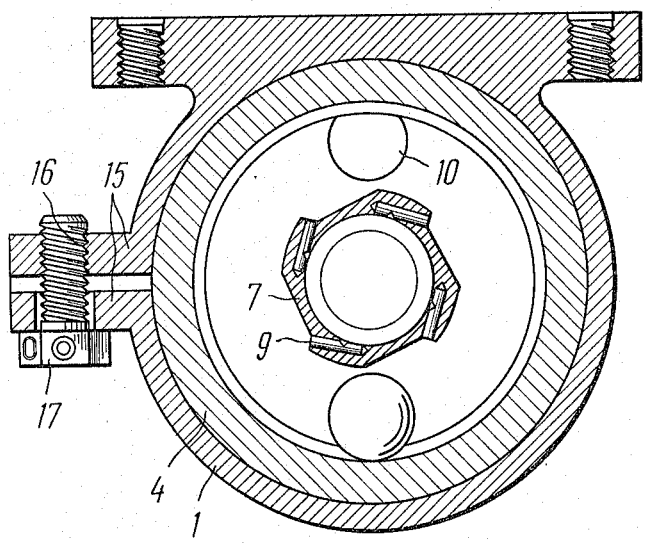

Other objects and advantages of the invention will become apparent from the following description and drawings, wherein:

FIG. 1 is a longitudinal section view of a pneumatic ball-type vibromotor according to the invention; and FIG. 2 is a section taken along line A—A in FIG. 1.

The pneumatic ball-type vibromotor comprises a housing 1 with front and rear end covers 2, 3 respectively. A ring 4 with an inner race 5 and a ball weight 6 inserted therein is disposed within the housing. Inside the ring 4, in the center thereof, is mounted a head 7, to which is admitted compressed air through a hose (not shown) which can be connected to pipe connection 8. The head 7 is provided with tangential nozzles 9, the number of which depends on constructive demands.

In the drawings a pneumatic ball type vibromotor with four nozzles is shown.

The pneumatic ball-type vibromotor begins to operate at an air pressure of 0.5 kg./cm.² Best results are attained when operating at a pressure of 4–5 kg./cm.² and 25,000 r.p.m. The used compressed air is vented to atmosphere through exhaust ports 10 in end cover 3.

The arrangement, number, form and size of the exhaust ports 10 depends on the rated power of the vibromotor.

The head 7 mounted in the center of the ring has a bore which opens at the side opposite to hose connection 8, said head having a threading 11 in said bore for connection with a plug 12, to which cover 3, by means of nut 13 and lock nut 14 is fixed.

Ring 4 is mounted in the housing 1 which is constructed in two parts, said parts having lugs 15, holes 16 and coupling bolts 17 joining the parts together.

The present invention is described in connection with its preferable embodiment; it will be understood, however, that various changes and modifications may be effected by those skilled in the art, without departing from the scope of the invention as defined in the appended claims.

I claim:

1. A pneumatic ball-type vibromotor comprising: a housing, means for fastening said housing to a structure to be subjected to vibration, a ring having an inner race secured in said housing, said housing and said ring defining a chamber, means for supplying compressed air into said chamber and arranged centrally within the same, and a ball within said chamber and movable along the inner race of said ring under the pressure of compressed air supplied through said means therefor.

2. A pneumatic ball-type vibromotor comprising: a housing, means for fastening said housing to a structure to be subjected to vibration, a ring having an inner race secured in said housing, said housing and said ring defining a chamber, a head disposed centrally within said chamber and secured with said housing, said head being provided with at least one tangential nozzle for supplying compressed air into said chamber, and a ball within said chamber and movable along the inner race of said ring under the pressure of compressed air supplied through said tangential nozzle.

3. A pneumatic ball-type vibromotor comprising: a housing, means for fastening said housing to a structure to be subjected to vibration, a ring having an inner race secured to said housing, said housing and said ring defining a chamber, a head disposed centrally within said chamber and secured with said housing, said head being provided with four tangential nozzles for supplying compressed air into said chamber, and a ball within said chamber and movable along the inner race under the pressure of compressed air supplied through said four tangential nozzles.

4. A pneumatic ball-type vibromotor comprising: a housing assembly including a cylinder having lugs with threaded holes for the connection of said housing assembly to a structure to be subjected to vibration, and two end face covers for said cylinder, a ring having an inner race securely mounted in said cylinder of the housing assembly, said end face covers of the housing and said ring defining a chamber, a head centrally disposed in said chamber and secured with said end covers, said head being provided with four tangential nozzles for supplying compressed air into said chamber, and a ball within said chamber and movable along the inner race under the pressure of compressed air supplied through said four tangential nozzles.

5. A pneumatic ball-type vibromotor comprising: a housing assembly including a cylinder provided with lugs and two end face covers, said lugs having threaded holes for the connection of said housing assembly to a structure to be subjected to vibration, said cylinder being split along a generatrix, means for securing the elements of said housing assembly together, a ring having an inner race securely mounted within said cylinder by said means serving to hold together the elements of said assembly, said end face covers of the housing and said ring defining a chamber, a head centrally disposed within said chamber and provided with four tangential nozzles for supplying compressed air into said chamber, said head having an axial bore in communication with said nozzles for the supply of compressed air thereto, said head being integral with and coaxial with one of said end covers, a plug secured to the other of said end covers and to said head, said other end cover having at least one opening for the discharge of exhausted air, and a ball within said chamber and movable along the inner race of said ring under the pressure of compressed air supplied through said four tangential nozzles.

References Cited by the Examiner

UNITED STATES PATENTS

| | | |
|---|---|---|
| 2,528,319 | 10/1950 | Peterson. |
| 2,535,596 | 12/1950 | Peterson. |
| 3,135,124 | 6/1964 | Sartor et al. _____ 74—87 |
| 3,162,426 | 12/1964 | Fontaine. |

FRED C. MATTERN, JR., *Primary Examiner.*

MILTON KAUFMAN, BROUGHTON G. DURHAM, *Examiners.*

D. H. THIEL, *Assistant Examiner.*